United States Patent
Crawshay et al.

(10) Patent No.: US 9,934,136 B2
(45) Date of Patent: Apr. 3, 2018

(54) AUTOMATED GENERATION OF SCRIPTED AND MANUAL TEST CASES

(71) Applicant: Landmark Graphics Corporation, Houston, TX (US)

(72) Inventors: David Crawshay, Katy, TX (US); Florin Mugur Anghelescu, Calgary (CA)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 91 days.

(21) Appl. No.: 14/892,800

(22) PCT Filed: Jul. 23, 2013

(86) PCT No.: PCT/US2013/051703
§ 371 (c)(1),
(2) Date: Nov. 20, 2015

(87) PCT Pub. No.: WO2015/012814
PCT Pub. Date: Jan. 29, 2015

(65) Prior Publication Data
US 2016/0132426 A1 May 12, 2016

(51) Int. Cl.
*G06F 11/00* (2006.01)
*G06F 11/36* (2006.01)
*G06F 3/0484* (2013.01)

(52) U.S. Cl.
CPC ...... *G06F 11/3688* (2013.01); *G06F 3/04842* (2013.01); *G06F 11/3684* (2013.01)

(58) Field of Classification Search
CPC ............. G06F 3/04842; G06F 11/3457; G06F 11/3668; G06F 11/3684; G06F 11/3688
See application file for complete search history.

(56) References Cited

U.S. PATENT DOCUMENTS 7,644,398 B2   1/2010   Cleaveland et al.
8,392,884 B2   3/2013   Specchio et al.
(Continued)

FOREIGN PATENT DOCUMENTS

CN         105393226 A       3/2016
WO    WO-2005071543 A2       8/2005
(Continued)

OTHER PUBLICATIONS

"Australian Application Serial No. 2013394952, Examination Report dated Sep. 19, 2016", 3 pgs.
(Continued)

*Primary Examiner* — Joshua P Lottich

(57) ABSTRACT

Systems and methods that provide manual test cases and scripted test cases automatically based on metadata included in a software application. In an embodiment, an application may include elements that generate an output file containing information corresponding to one or more forms with one or more fields in an application. The information may be utilized by a test device or application to automatically generate manual test cases, automated scripted test cases, or a combination of manual and automated test cases based on the information. In an embodiment, a manual test case may include a sequence of instructions in a natural language format. In an embodiment, an automated test case may be in a script language configured to interact with the application or an appropriate application emulator.

21 Claims, 5 Drawing Sheets

(56) References Cited

U.S. PATENT DOCUMENTS

| | | | | |
|---|---|---|---|---|
| 8,893,087 | B2* | 11/2014 | Maddela | G06F 8/70 714/745 |
| 2003/0009709 | A1* | 1/2003 | Belenger | G06F 11/3688 714/37 |
| 2004/0181713 | A1* | 9/2004 | Lambert | G06F 11/3688 714/48 |
| 2005/0187930 | A1* | 8/2005 | Subramanian | G06F 11/3668 |
| 2005/0268285 | A1* | 12/2005 | Bagley | G06F 11/3688 717/124 |
| 2007/0092069 | A1* | 4/2007 | Royzen | G06F 9/45512 379/27.04 |
| 2007/0124305 | A1* | 5/2007 | Smith | G06F 11/36 |
| 2007/0168971 | A1 | 7/2007 | Royzen et al. | |
| 2008/0256517 | A1 | 10/2008 | Atkin et al. | |
| 2009/0018811 | A1 | 1/2009 | Paradkar et al. | |
| 2009/0019315 | A1* | 1/2009 | Belvin | G06F 11/3688 714/38.14 |
| 2009/0077422 | A1 | 3/2009 | Khaladkar et al. | |
| 2011/0088018 | A1* | 4/2011 | Foley | G06F 11/3684 717/131 |
| 2011/0123973 | A1* | 5/2011 | Singh | G06F 11/3668 434/322 |
| 2011/0214107 | A1* | 9/2011 | Barmeir | G06F 11/3684 717/125 |
| 2012/0117095 | A1 | 5/2012 | Chavvakula et al. | |
| 2013/0074043 | A1 | 3/2013 | Fu | |
| 2013/0097586 | A1 | 4/2013 | Chandra et al. | |
| 2013/0106878 | A1 | 5/2013 | Williams | |
| 2014/0108583 | A1* | 4/2014 | Kulkarni | H04L 51/046 709/206 |
| 2014/0165040 | A1* | 6/2014 | Augustin | G06F 11/3684 717/124 |
| 2014/0229923 | A1* | 8/2014 | Sennewald | G06F 11/3692 717/127 |
| 2014/0359371 | A1* | 12/2014 | Schur | G06F 11/3684 714/38.1 |
| 2017/0147480 | A1* | 5/2017 | Lachwani | G06F 11/3684 |

FOREIGN PATENT DOCUMENTS

| | | |
|---|---|---|
| WO | WO-2012063070 A1 | 5/2012 |
| WO | WO-2015012814 A1 | 1/2015 |

OTHER PUBLICATIONS

"German Application Serial No. 112013007271.8, Response filed Jun. 30, 2016 to Office Action dated Feb. 26, 2016", (w/ English Translation of Claims), 22 pgs.

"German Application Serial No. 112013007271.8, Office Action dated Jul. 6, 2016", (w/ English Translation), 2 pgs.

"International Application Serial No. PCT/US2013/051703, Response filed Nov. 19, 2014 to International Search Report dated Apr. 10, 2014", 6 pgs.

"Singaporean Application Serial No. 11201509527T, Search Report and Written Opinion dated Aug. 3, 2016", 8 pgs.

"10 Best Tools for Test Automation—Tools Journal", (2011), 1-8.

"International Application Serial No. PCT/US2013/051703, International Search Report dated Apr. 10, 2014", 3 pgs.

"International Application Serial No. PCT/US2013/051703, Written Opinion dated Apr. 10, 2014", 8 pgs.

"German Application Serial No. 112013007271.8, Office Action dated Feb. 26, 2016", (w/ English Summary), 8 pgs.

* cited by examiner

AUTOMATED GENERATION OF SCRIPTED AND MANUAL TEST CASES

PRIORITY APPLICATIONS

This application is a U.S. National Stage Filing under 35 U.S.C. § 371 from International Application No. PCT/US2013/051703, filed on 23 Jul. 2013, and published as WO 2015/012814 on 29 Jan. 2015, which application and publication are incorporated herein by reference in their entirety.

BACKGROUND

The increasing use and reliance on software applications, particularly in areas where mobile computing devices enable a variety of use cases that were previously not available or practical have increased the need for software testing tools. One method of creating manual test cases for a software application is for a domain tester to create a test case in a natural language (e.g., human readable English) describing potential interactions with the software application. The manual test cases are then utilized by an automation engineer to create an automated script to perform the test cases on an instance of the software application. This process can be tedious, time consuming, and prone to errors.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DESCRIPTION OF EXAMPLE EMBODIMENTS

During the development of an application a developer has access to all the object names (e.g., fields, buttons, functions, etc.) within the application. In order to decrease the time needed for building an automated test process the developer may add instructions or modules to the application that may automatically generate an output file when the application is operated. In general, a tester may open a report screen in the application and the instructions or modules in the application will generate the output file that contains the names and any other information pertinent to all the fields in the report.

Additionally, the output file may contain all of the field names concatenated with one or more function names (e.g., populateFields and verifyFields), and the value the fields expect that may be populated with an automated test script. The generation of the output file may be an option that takes place in response to a request (e.g., an enabled/disable setting in the application). In another example the output file may be generated by the developer who may pass the file on to an automation test engineer to facilitate automated testing of the application.

These methodology and mechanisms for creating test cases may be utilized to generate both automated test scripts as well as manual test cases. Any of the objects within an application to be tested may be enumerated by the application itself and exported to an output file along with a set of data corresponding to each one of the objects. In this manner tester time and frustration may be reduced because the domain tester does not need to generate or enter test scripts in the 'function/code' format that may only be germane to the application developer.

Figure 1:
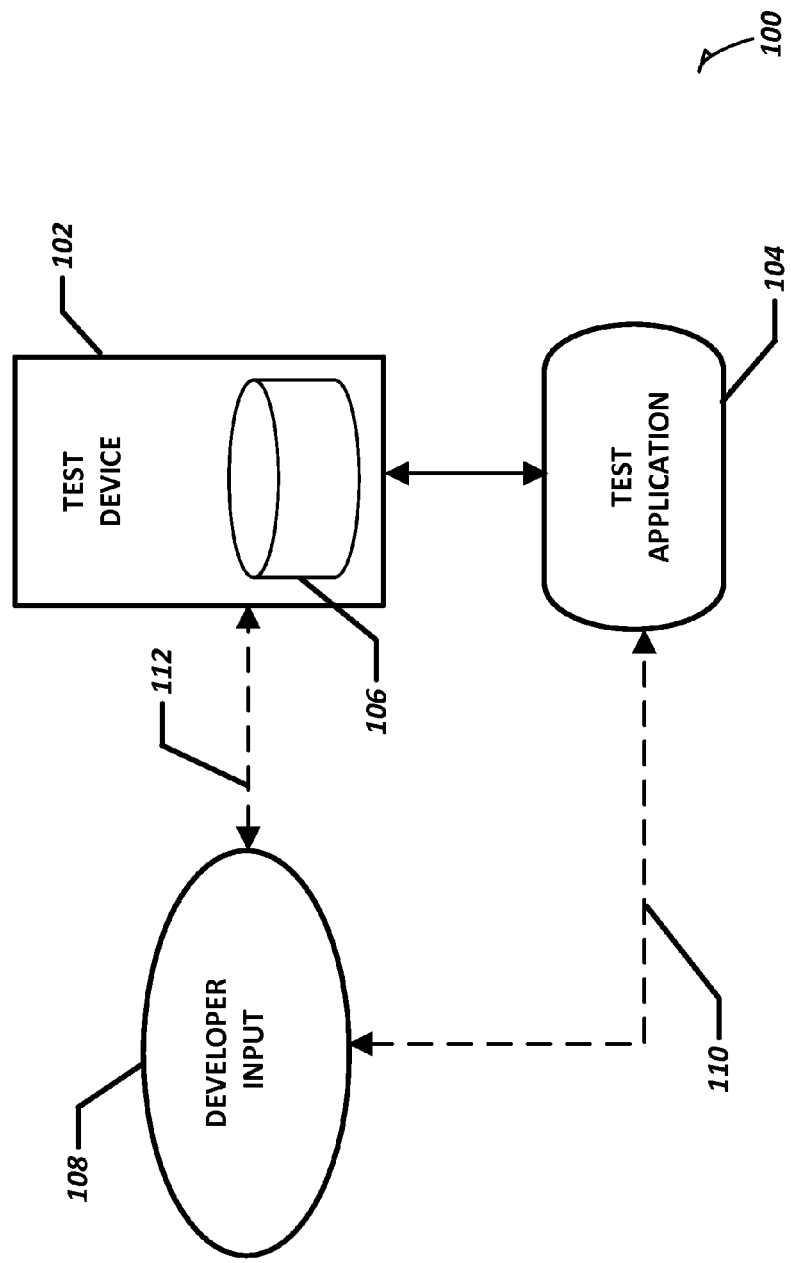
FIG. 1 is a block diagram illustrating an example test case generation system in accordance with some embodiments.

FIG. 1 is a block diagram illustrating an example test case generation system 100 in accordance with some embodiments. In an example, a test device 102 may be coupled to a test application 104. The test application may be executed by the test device 102 in an emulation environment, or by a second device that may be coupled to the test device 102 by a physical or network connection (e.g., over a wired or wireless network). The test device 102 may include a test case database 106 configured to store test cases that may be applied to the test application 104.

The test case generation system 100 may include a user interface with the test device 102, the test application 104, or both. The user interface may provide a mechanism for a developer 108 to optionally interact with the test device 102 via a test device input 112 or with the test application via a direct application input 110. In an example, the developer 108 may interact with the test application 104 while the test device 102 is recording or monitoring the activities of the test application 104. In this manner the test device 102 may accumulate information related to the one or more functionalities of the test application 104.

For example, the test case database 106 may include test scripts in one or more computer based languages (e.g., C#, JAVA, etc.) that may interact with the test application 104 in order to test one or more functionalities of the test application 104. In another example, the test database 106 may include one or more manual test cases. A manual test case may include a sequence of instructions in a natural language format (e.g., English, Spanish, etc.). The sequence of instructions may provide a test developer with a user readable scenario that the test developer may utilize to manually operate options or features in the test application 104 in order to exercise the manual test case.

In an example, a workflow in the test application 104 may be covered by a manual or automated test case and rerun multiple times. For example, a SAVE operation on a report or form can be performed in a variety ways, such as selecting a save option from a FILE menu, selecting a Close and Save option, or by opening a new report that causes a prompt to save an existing report to be generated. In this manner a domain tester may request the execution of a test script to verify the functionality of the SAVE operation and generate a report. In response the test device 102 may automatically generate scripts to cover all of the potential SAVE scenarios. The Save( ) function may be configured to report its name as a variable by the application developer to allow the manual test cases generated by the test device 102 to provide all the SAVE operations to be executed.

Figure 2:
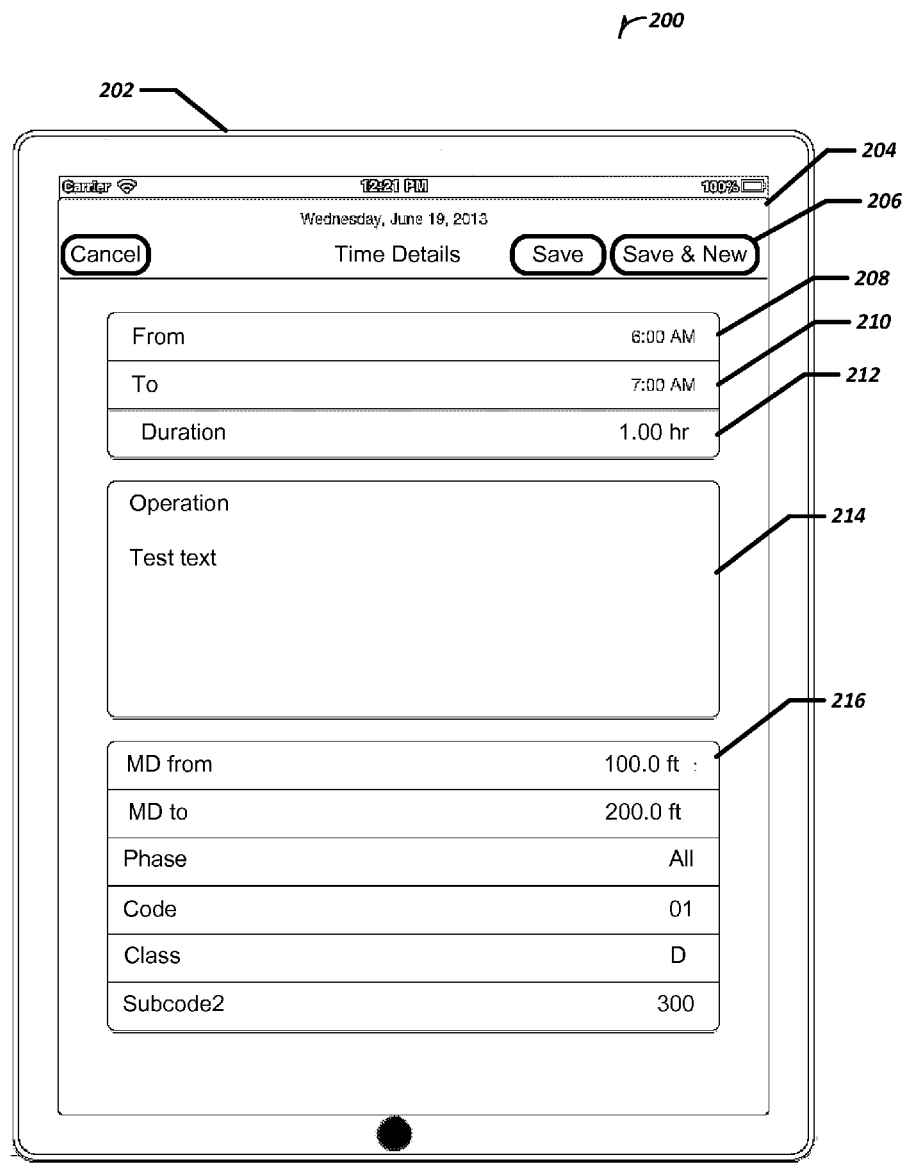
FIG. 2 depicts an example of a computing device displaying a user-editable form.

FIG. 2 depicts an example 200 of a computing device 202 displaying a user-editable form 204. The computing device 202 may include on or more user input mechanisms, for example a touch screen display that may allow a user to interact with the user-editable form 204. The user-editable form 204 may include a plurality of user-editable fields. The form may include one or more form navigation options. For example, the SAVE & NEW button 206 may, when activated by a user input on the computing device 202 or under the direction of a testing mechanism configured to simulate the user input, save the data in the user-editable fields and generate a new, blank version of the user-editable form 204.

The fields in the user-editable form 204 may, for example, include a FROM field 208 configured to receive a start time, a TO field 210 configured to receive an end time, a DURATION field 212 configured to receive a length of time in hours, open text field 214 configured to receive plain text data, and other typed or untyped (e.g., free form) data fields. Another example of a typed data field includes a MEAN DISTANCE field 216 that is configured to receive data as a unit of measure.

In an example, a set of plain English instructions for a manual test case interaction with form 204 may include:
1) Tap on "FROM" field.
2) Enter Value "6:00 AM".
3) Get value from "FROM" field.
4) Compare value with "6:00 AM".
5) Tap on "TO" field.
6) Enter Value "7:00 AM".
7) Get value from "TO" field.
8) Compare value with "7:00 AM".
9) Tap on "Duration" calculated field.
10) Get value from "Duration" calculated field.
11) Compare value with "1.00".

In an similar example, a set of automation program instructions for a scripted test case interaction with form 204 may include:
1) TapField("FROM").
2) SetFieldValue("6:00 AM").
3) Value=GetFieldValue( ).
4) CheckEquals(Value, "6:00 AM").
5) TapField("TO").
6) SetFieldValue("7:00 AM").
7) Value=GetFieldValue( ).
8) CheckEquals(Value, "7:00 AM").
9) TapField("Duration").
10) Value=GetFieldValue( ).
11) CheckEquals(Value, 1.0).

In a similar manner each field in the form may be iteratively tested either by a manual interaction with the form 204 by a human tester, or by the application of the scripted test case instructions in an automated test case environment.

Figure 3:
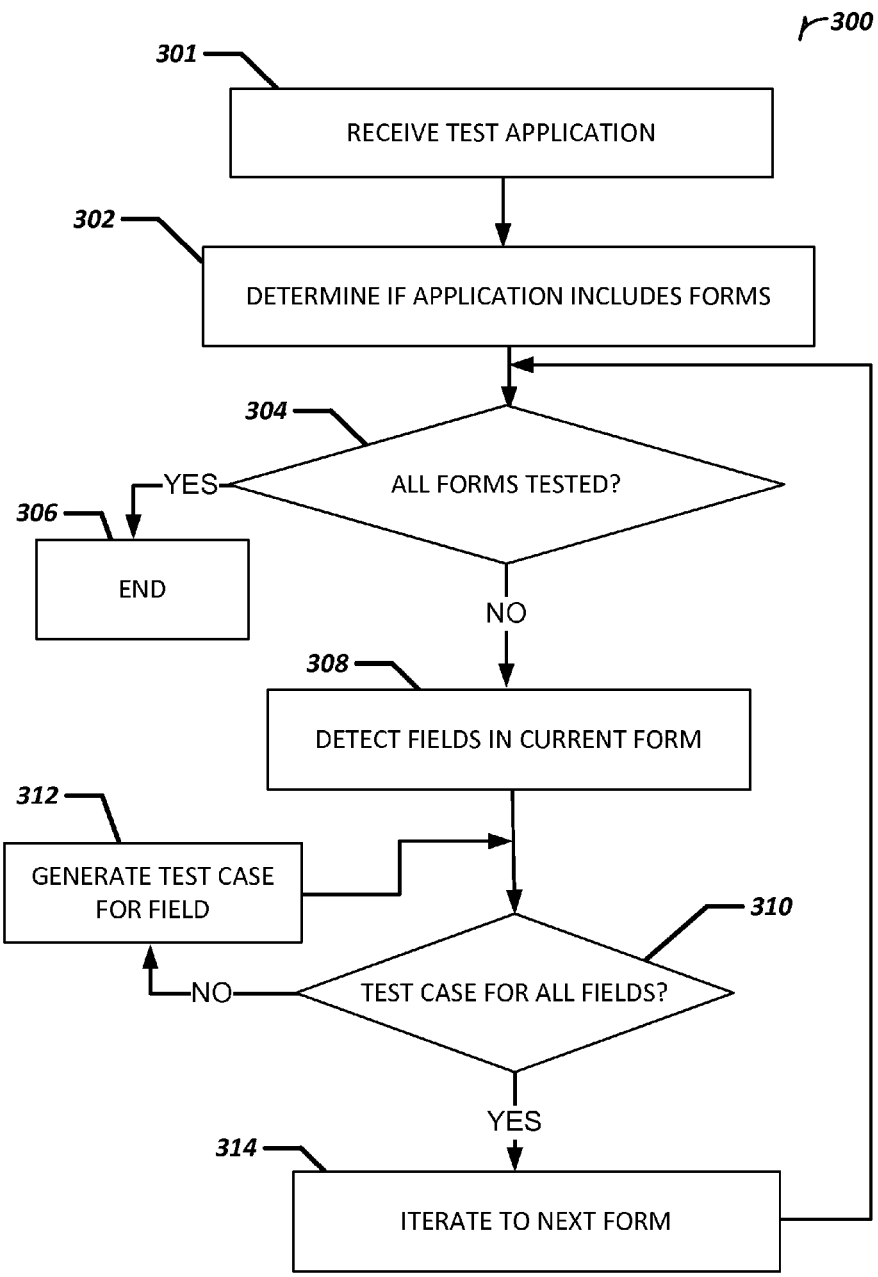
FIG. 3 is a flow chart illustrating an example method of inspecting an application, in accordance with some embodiments.

FIG. 3 is a flow chart illustrating an example method 300 of inspecting an application, in accordance with some embodiments. In an example, the method 300 may be performed by test device 102 of FIG. 1 in an attempt to generate test cases for the application, such as test application 104.

At 301, a test device may receive a test application. In an example the test application may be executed by the test device in a native mode, or in an emulation mode. In another example, the test device may receive only data indicating the functionality and behavior of the test application through a communication link, such as a network connection between the test device and a second device executing the test application.

At 302, the test device may determine if the test application includes forms. For example, a test application may include a user editable form such as form 204 of FIG. 2. The form may include user editable field, user controls, or other user interface features.

At 304, the test device may check to determine if all of the forms in a test application have been tested. At 306, if all forms in the test application have been tested the method may terminate. At 308, if one or more forms in the test application have not been tested the test application may attempt to detect editable fields in the current form. Editable fields may include any of a variety of user interface mechanism where a user may provide data such as text, values, or other information in a dialog area or through the selection of one or more options such as radio buttons, sliders, check boxes, search boxes, dropdown menus, or other interface elements.

At 310, the test device may check to determine if all of the fields in a test application have a corresponding test case. At 312, if any field in the form does not have a corresponding test case, a test case is generated for that field. This sequence of checking and generating test cases for all fields in a form may be repeated until a test case for all fields is provided.

At 314, the test device may iterate to the next form in the test application. In this manner all forms within the test application may be inspected for fields, and each field in each form may have a corresponding test case generated without the need for user intervention.

Though arranged serially in the example of FIG. 3, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 4:
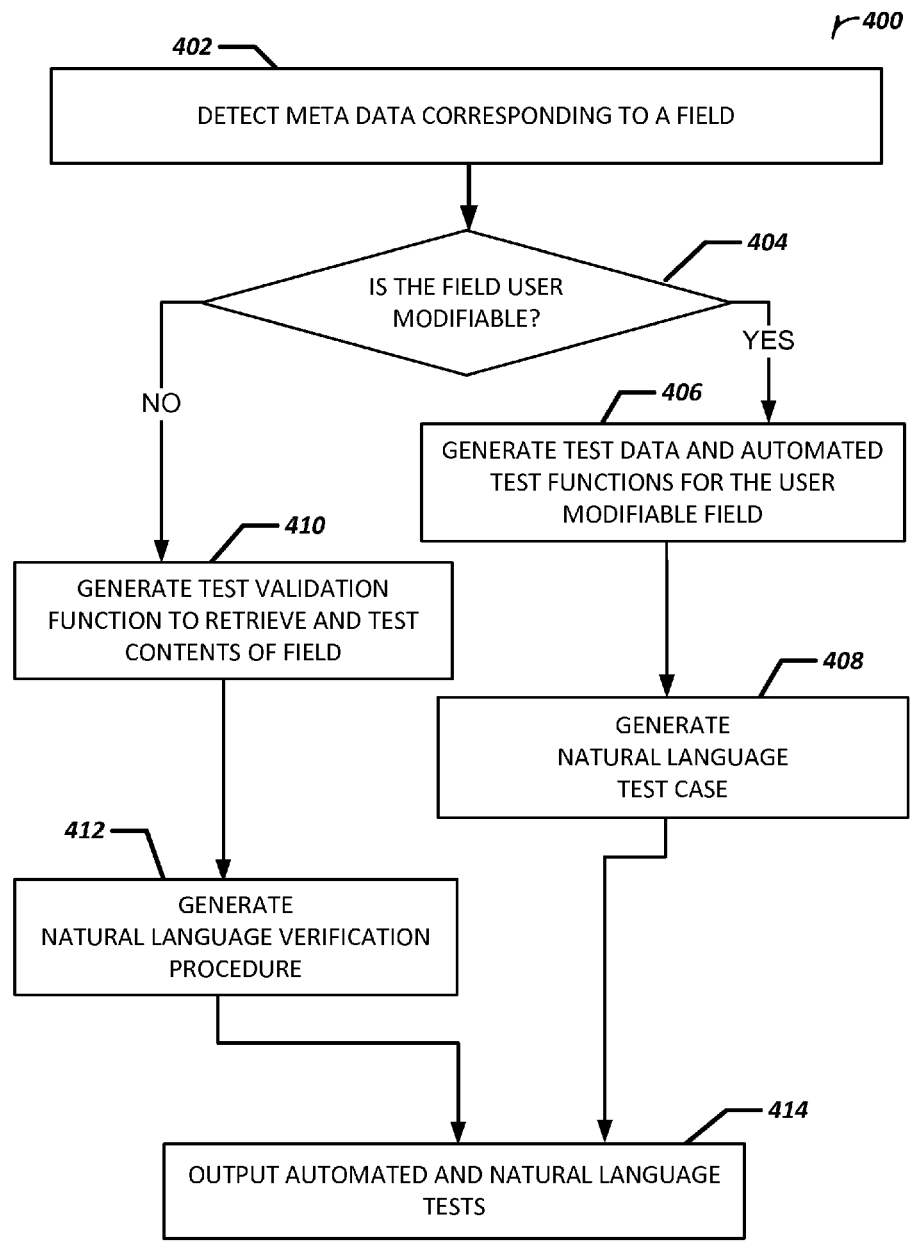
FIG. 4 is a flow chart illustrating an example method for generating test cases, in accordance with some embodiments.

FIG. 4 is a flow chart illustrating an example method 400 for generating test cases, in accordance with some embodiments. In an example, the method 400 may be performed by a computing device such as test device 204 of FIG. 3 at operation 312 of FIG. 3.

At 402, a test device may detect metadata corresponding to a field in a form. The field may be unique to a specific form, or a common field that is present on multiple forms. The meta data may provide information specifying one or more properties for the field, such as whether the field is user-editable, a valid format or value range for data that may be entered into the field or other information that may be indicate a feature or functionality of the field that may be tested.

At 404, the test device may determine whether or not the field is user modifiable. For example, a user modifiable field may include a field where the user may edit content, or make a predetermined selection between one or more options. A field that is not user modifiable may include a field that is read only. For example, a field where information (e.g., the result of a calculation or other data) is presented to the user.

At 406, if the test device determines that the field is user modifiable; the test device may generate test data and automated test function for the user modifiable field based on metadata corresponding to the field. In an example, an automated test function may include a script function to populate the field with a data value included in the metadata.

At 408, the test device may generate a natural language test case. In an example, the natural language test case may be based on the automated test function generated at 406. In another example, the natural language test case may be independently generated based on the metadata corresponding to the field.

At 410, if the test device determines that the field is not user modifiable, the test device may generate a test validation function to retrieve and test the contents of the field. For example, the test function may read a value presented by the field and compare the value against data included in the metadata, or against a computed value derived from one or more other test variables.

At 412, the test device may generate a natural language validation procedure. In an example, the natural language validation procedure may be based on the test validation function generated at 410. In another example, the test validation function may be independently generated based on the metadata corresponding to the field.

At 414, the test device may output the automated and natural language tests. In an example, the test device may output the automated test functions and the test validation functions to a first file, and the natural language test cases and natural language verification procedures to a second file. In this manner both automated scripts and natural language test suites may be developed by an automated system.

Though arranged serially in the example of FIG. 4, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 5:
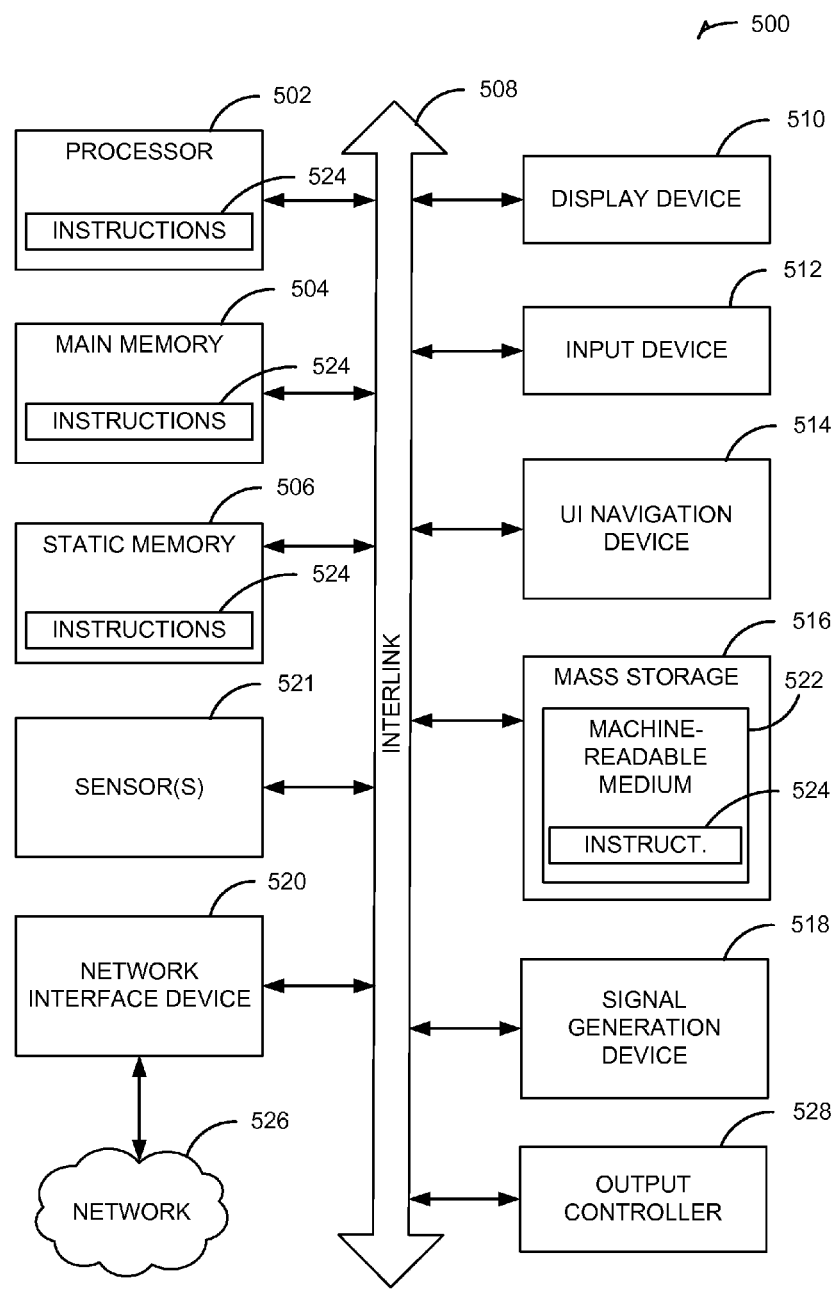
FIG. 5 is a block diagram illustrating an example machine upon which any one or more of the techniques discussed herein may be performed.

FIG. 5 is a block diagram illustrating an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a processing unit, a graphics processing unit (GPU), a hardware processor core, or any combination thereof), a main memory 504, and a static memory 506, some or all of which may communicate with each other via an interlink 508 (e.g., a bus, link, interconnect, or the like). The machine 500 may further include a display device 510, an input device 512 (e.g., a keyboard), and a user interface (UI) navigation device 514 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, camera, video recorder, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524.

The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

What is claimed is:

1. A method of generating test cases comprising:
   receiving, by a processor, a test application in an executable format, the test application including a plurality of forms;
   simulating the execution of the test application with the processor;
   iterating through each one of the plurality of forms of the test application;
   detecting a field in at least one form of the plurality of forms;
   inspecting a field included in the at least one form for metadata in the test application;
   generating, based on the metadata, at least one test case corresponding to the field;
   storing the test case in a first format; and
   storing the test case in a second format that is different from the first format.

2. The method of claim 1, wherein storing the test case in the second format includes converting the test case from the first format to a second format.

3. The method of claim 1, wherein the first format is an automated testing language and the second format is a natural language format.

4. The method of claim 3, wherein the automated testing language is a script language.

5. The method of claim 1, wherein generating the at least one test case corresponding to the field includes determining a value appropriate for the field based on the content of the metadata.

6. The method of claim 1, wherein the iterating through each one of the plurality of forms is performed automatically.

7. The method of claim 1, further comprising:
   receiving a navigation input from a user selection of a form from the plurality of forms;
   wherein the iterating through each one of the plurality of forms is based at least in part on the navigation input from the user.

8. A test case generation system comprising:
   a processor; and
   a memory coupled to the processor, the memory having processor-readable instructions stored therein, which, when executed by the processor, cause the processor to perform a plurality of functions, including functions to:
   receive and interact with a test application, the test application including metadata corresponding to at least one functionality of the test application;
   retrieve metadata corresponding to a data entry form included in the test application;
   generate a test case to test the at least one functionality of the test application, based at least in part on the corresponding metadata; and
   store the test case in a first format and a second format different from the first format, the test case corresponding to a field of the data entry form.

9. The test case generation system of claim 8, wherein the functions performed by the processor further include functions to convert the test case from the first format to the second format.

10. The test case generation system of claim 8, wherein the first format is an automated testing language and the second format is a natural language format.

11. The test case generation system of claim 10, wherein the automated testing language is a script language.

12. The test case generation system of claim 8, wherein the functions performed by the processor further include functions to determine a value appropriate for the field based on the content of the metadata to generate the test case.

13. The test case generation system of claim 8, wherein the functions performed by the processor further include functions to iterate through each one of the plurality of forms automatically.

14. The test case generation system of claim 8, wherein the functions performed by the processor further include functions to receive a navigation input from a user indicating the selection of a form of the plurality of forms, and to iterate through each one of the plurality of forms based at least in part on the navigation input from the user.

15. A non-transitory computer readable medium comprising instructions that when executed by a processor cause the processor to:
   receive a test application in an executable format, the test application including a plurality of forms;
   simulate the execution of the test application with the processor;
   iterate through each one of the plurality of forms of the test application;
   detect a field in at least one form of the plurality of forms;
   inspect a field included in the at least one form for metadata in the test application;
   generate, based on the metadata, at least one test case corresponding to the field;
   store the test case in a first format; and
   store the test case in a second format that is different from the first format.

16. The non-transitory computer readable medium of claim 15, wherein the instructions further cause the processor to convert the test case from the first format to a second format.

17. The non-transitory computer readable medium of claim 15, wherein the first format is an automated testing language and the second format is a natural language format.

18. The tangible non-transitory computer readable medium of claim 17, wherein the automated testing language is a script language.

19. The non-transitory computer readable medium of claim 15, wherein generation of the at least one test case corresponding to the field includes determining a value appropriate for the field based on the content of the metadata.

20. The non-transitory computer readable medium of claim 15, wherein the iterating through each one of the plurality of forms is performed automatically.

21. The non-transitory computer readable medium of claim 15, further comprising instructions that when executed by a processor cause the processor to:
   receive a navigation input from a user selection of a form from the plurality of forms;
   wherein the iteration through each one of the plurality of forms is based at least in part on the navigation input from the user.

\* \* \* \* \*